United States Patent [19]

Shichida et al.

[11] 4,053,251

[45] Oct. 11, 1977

[54] DRILLING MACHINE WITH AUTOMATIC TOOL CHANGER

[76] Inventors: Hiromichi Shichida, 984-121, Misawa, Hino, Tokyo; Hideo Katsube, 2-2-2, Myojin-cho, Hachioji, Tokyo; Kenichi Toyoda, 3-27, Tamadaira, Hino, Tokyo; Mitsuo Saito, 2-2-15, Seijo, Setagaya, Tokyo, all of Japan

[21] Appl. No.: 676,563

[22] Filed: Apr. 13, 1976

[30] Foreign Application Priority Data

Apr. 25, 1975  Japan .................... 50-49748

[51] Int. Cl.² ........................................ B23B 39/20
[52] U.S. Cl. ................................................ 408/35
[58] Field of Search ...................................... 408/35

[56] References Cited

U.S. PATENT DOCUMENTS

| | | | |
|---|---|---|---|
| 2,764,044 | 9/1956 | Schrieder | 408/35 |
| 2,870,659 | 1/1959 | Burg | 408/35 |
| 2,893,270 | 7/1959 | Hodgson | 408/35 |
| 2,991,666 | 7/1961 | Charlat | 408/35 |
| 3,003,165 | 10/1961 | Charlat | 408/35 |

*Primary Examiner*—Harrison L. Hinson

[57] ABSTRACT

A drilling machine with an automatic tool changer (A.T.C.) including a driving motor which drives a spindle head to traverse, upwards and downwards and a tool magazine which is rotatably supported by the spindle head and has a plurality of tools, wherein when one of the tools is to be interchanged with another of the tools, said tool magazine is rotated at predetermined angles by the driving motor by means of the spindle head and a link mechanism.

7 Claims, 18 Drawing Figures

Fig. 5-1  Fig. 5-2  Fig. 5-3
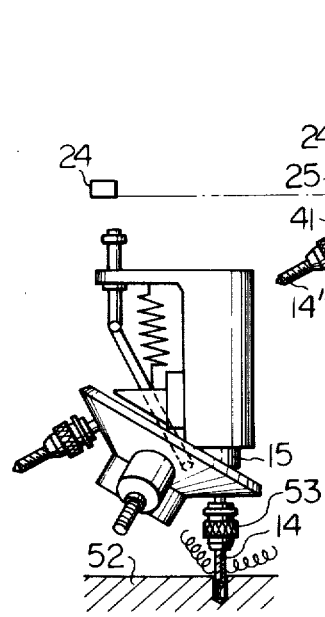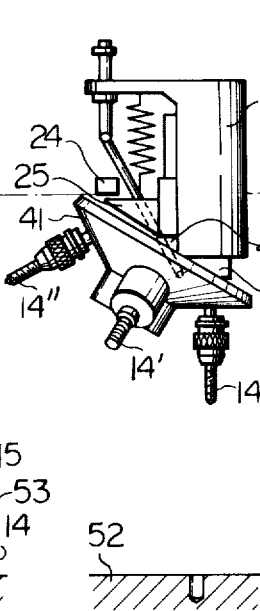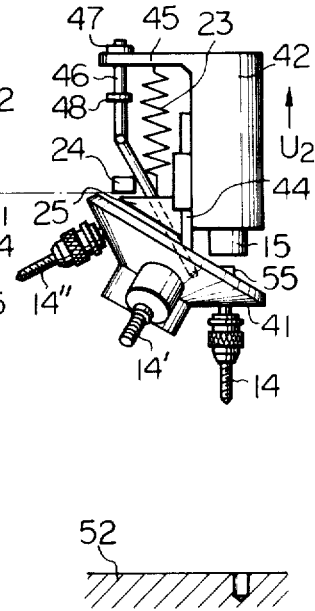
Fig. 5B-1  Fig. 5B-2  Fig. 5B-3
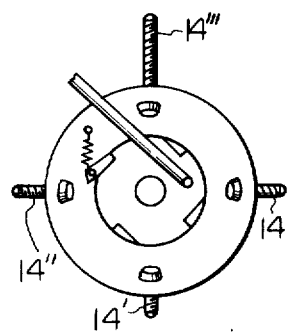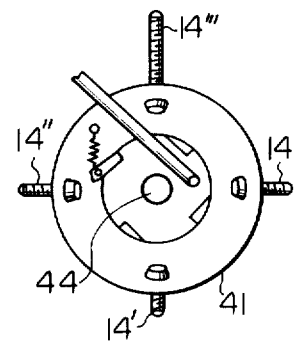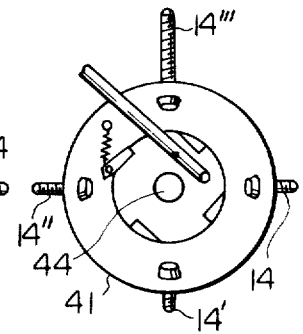

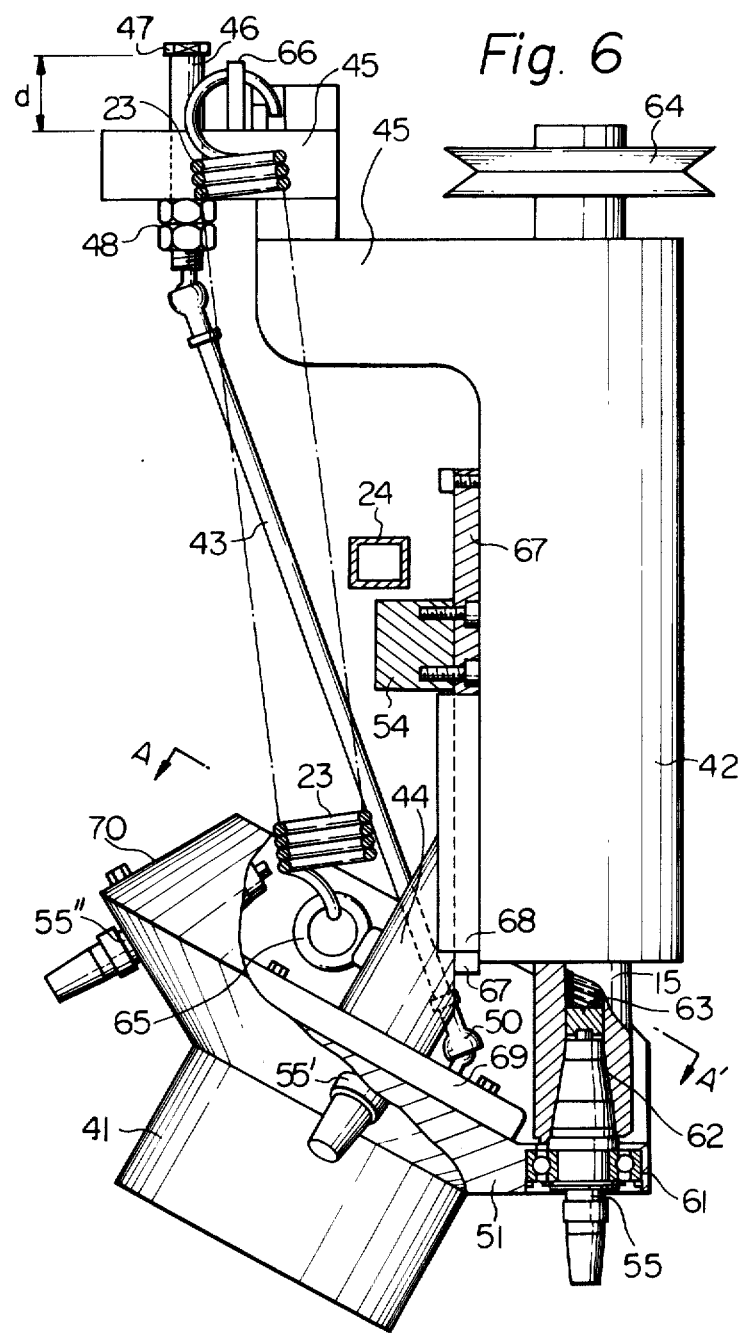

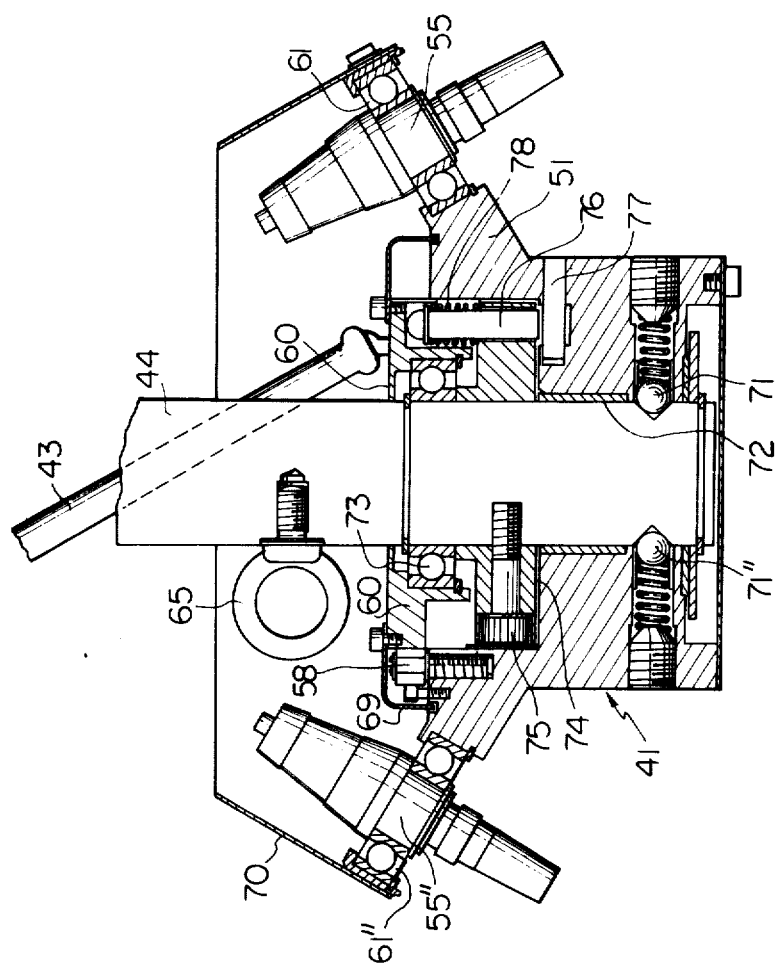

DRILLING MACHINE WITH AUTOMATIC TOOL CHANGER

BACKGROUND AND SUMMARY OF INVENTION

The present invention relates generally to a drilling machine, and more particularly to a drilling machine which has a number of tools therein. The drilling machine automatically selects a desired tool and functions like a so-called drilling machine with an automatic tool changer (A.T.C.).

A drilling machine with an automatic tool changer is basically comprised of: a bed; a table which is slidably located on the bed and moves a workpiece to any desired position along a horizontal plane; a tool which is arranged vertically and drills the work; a spindle, to which the tool is detachably connected, which rotates together with the tool; a spindle head by which the spindle is rotatably held; a spindle driving motor which is mounted to the spindle head and rotates the spindle; a lead screw, which is fixed to the bed, and located near the spindle head, and is extended parallel to the spindle; a ball nut which is provided in the spindle head and engaged with the lead screw;

a driving motor which rotates said lead screw and moves said spindle head, together with the said spindle and said spindle driving motor, by means of said ball nut provided in the spindle head. In the above described drilling machine with an automatic tool changer, the tool is one of a predetermined number of tools. These tools are rotatably held by a circular tool magazine and are arranged at a constant pitch along the periphery thereof. Furthermore, the circular tool magazine is rotatable with respect to the spindle head in an intermittent motion. Each of the tools comes under the spindle when the circular tool magazine rotates in an intermittent motor. When one of the tools is needed for drilling, the spindle head is traversed upward by the driving motor, together with the spindle and also with the spindle driving motor, by means of the lead screw and the ball nut. Then, the tool magazine can freely rotate without running against the spindle. Subsequently, the desired tool comes under the spindle and the axis of the desired tool is aligned with the axis of the spindle. After this, the spindle head is traversed downwardly, thereby connecting the spindle with the desired tool.

In the drilling machine with an automatic tool changer of the prior art, the circular tool magazine is rotated by an electric pulse motor. As a result of the electric pulse motor being provided inside the circular tool magazine, the circular tool magazine is of a relatively large size, heavy weight and complicated construction. Further, the cost of the circular tool magazine becomes relatively high. This is because the circular tool magazine requires an electric pulse motor which only drives the circular tool magazine and a drive control circuit which only controls the electric pulse motor.

Therefore, it is the principal object of the present invention to provide a drilling machine with an automatic tool changer consisting of a circular tool magazine which requires no driving motor mechanism such as an electric pulse motor inside or outside of the circular tool magazine. Accordingly, the drilling machine with an automatic tool changer of the present invention is of a relatively small size, light weight, simple in construction and low in cost.

The present invention will be more apparent from the ensuing description with reference to the accompanying drawings wherein:

BRIEF DESCRIPTION OF THE DRAWINGS

FIGS. 5-1, 5-2, 5-3, 5-4, 5-5 and 5-6 are schematic front views, partly schematic, of the drilling machine with an automatic tool changer according to the present invention, showing the machine in each tool changing process;

FIGS. 5B-1, 5B-2, 5B-3, 5B-4 and 5B-6, are plane views of the tool magazine shown in FIGS. 5-1, 5-2, 5-3, 5-4, 5-5 and 5-6, respectively;

FIG. 6 is a partial cross-sectional front view of a main portion of the drilling machine with an automatic tool changer according to the present invention, and;

FIG. 7 is a cross-sectional view of the tool magazine taken along the line A—A' in FIG. 6.

DESCRIPTION OF THE PREFERRED EMBODIMENT

Figure 1:
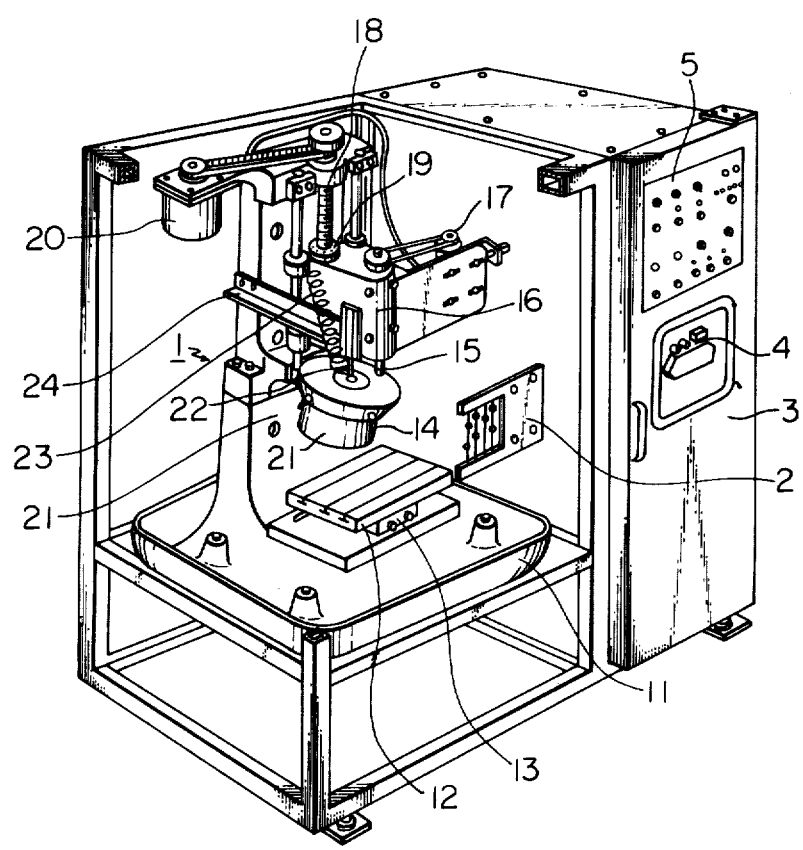
FIG. 1 is a perspective view, partially cut away, showing a drilling machine with an automatic tool changer of the prior art.

FIG. 1 is a perspective view, partially cut away, showing a drilling machine with an automatic tool changer of the prior art, contained in a numerically controlled machine tool. In FIG. 1, 1 is a drilling machine with an automatic tool changer of the prior art. The drilling machine 1 is basically comprised of: a bed 11; a table 12 on which a workpiece (not shown) can be fixed and which moves to any desired position along a horizontal plane by means of a surface electric pulse motor 13; a tool 14 which is arranged vertically and drills the piece of work; a spindle 15 to which the tool 14 is connected and which rotates together with the tool; a spindle head 16 by which the spindle 15 is rotatably held; a spindle driving motor 17 which is mounted to the spindle head 16 and rotates the spindle 15; a lead screw 18 which is fixed to the bed 11, is located near the spindle head 16 and extends parallel to the axis of the spindle 15; a ball nut 19 which is provided in the spindle head 16 and engages with the lead screw 18; a driving motor 20 which rotates the lead screw 18 and vertically moves the spindle head 16, together with the spindle 15 and also the spindle driving motor 17, by means of the ball nut 19. In the above described drilling machine 1, the tool 14 is one of a predetermined number of tools (14', 14" . . . ), for example, four or seven tools. These tools are rotatably held by a tool magazine 21 and are arranged at a constant pitch along the periphery of the tool magazine 21. The tool magazine 21 is rotatably held by a bar 22 on its one end. The other end of the bar 22 is slidably supported by the spindle head 16. The axis of the bar 22 is inclined with respect to the axis of the spindle 15. The bar 22 is supported by a coil spring 23 at its one end. The other end of the coil spring 23 is fixed to a frame (not shown). Thus, the tool magazine 21 is always pulled up by means of the coil spring 23. By the help of this upward pulling force, the desired one of the tools (14, 14', 14" . . . ) after it comes under the spindle 15, is firmly connected to the spindle 15 by means of a tapered shank coupling (not shown). When one of the tools (14, 14', 14" . . . ) is desired for drilling, the driving motor 20 is driven to rotate and the spindle head 16 is traversed upward through the lead screw 18 and the ball nut 19. At the same time the tool magazine 21 is traversed upward by means of the coil spring 23 and, finally, the tool magazine 21 abuts against a stopper 24. At this point the tool magazine 21 stops traversing upward, however, the spindle head 16 continues to traverse upward. Therefore, the tapered shank coupling is released and the spindle 15 moves vertically far away from the tool magazine 21. The spindle head 16 stops traversing upward when it meets with an upper limit switch (not shown). The upper limit switch is fixed to a frame (not shown) at a predetermined distance from the table 12. The predetermined distance regarding the upper limit switch and also other predetermined distances regarding other limit switches (not shown), or spindle travels, are freely set previously by using a limit swtich preset unit 2. Since the spindle 15 moves far away from the tool magazine 21, the tool magazine 21 may freely rotate without running against the spindle 15. Then, amplified command pulses are supplied to an electric pulse motor (not shown) from a numerically controlled unit 3. The numerically controlled unit 3 provides many kinds of command pulses in accordance with a command tape. The command tape includes:

Information for moving the table 12 together with a work piece to any desired position by controlling the surface electric pulse motor 13 in each drilling operation;

Information concerning the feed rate or the spindle speed at which the spindle driving motor 17 is driven, and information disclosing the drilling depth and the traverse rate with which the driving motor 20 is driven in each drilling process. The above-mentioned different types of information contained on the command tape are read by a tape reader 4. When manual operation is required, an operator operates the buttons mounted on the operator's panel 5.

Figure 2:
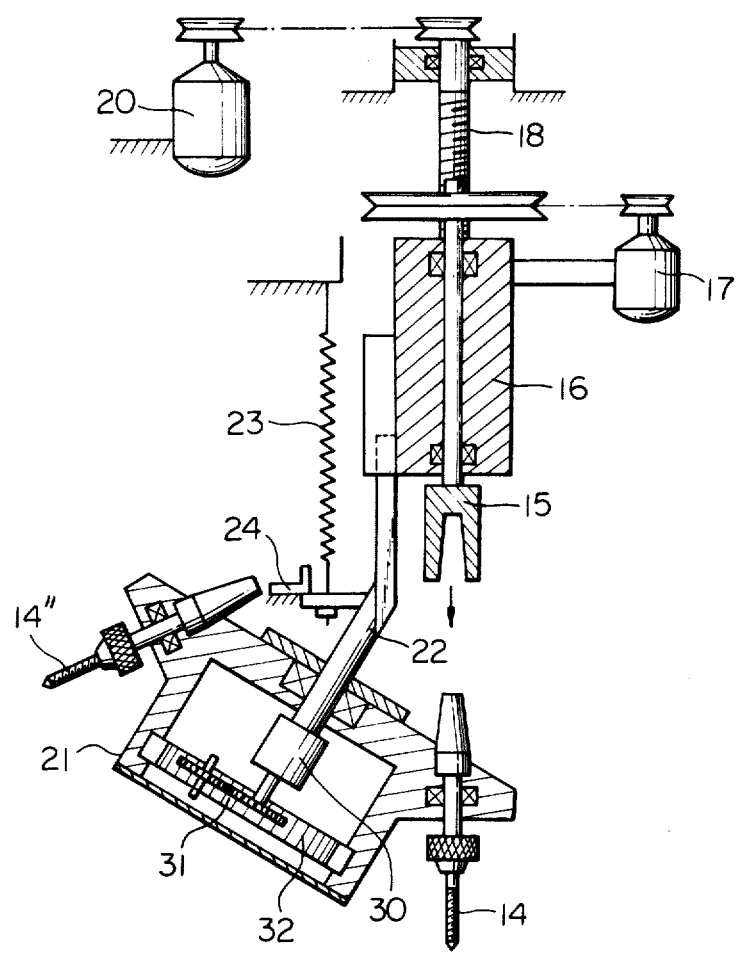
FIG. 2 is a schematic and sectional front view of the drilling machine with an automatic tool changer of the prior art.

As mentioned above, when the spindle 15 moves far away from the tool magazine 21, amplified command pulses are supplied to the electric pulse motor from the numerically controlled unit 3. The electric pulse motor is disclosed in FIG. 2, which shows a schematic sectional front view of the drilling machine 1 shown in FIG. 1. In FIG. 2, reference numerals 14, 14", 15, 16, 17, 18, 20, 21, 22, 23 and 24 indicate the same parts described when referring to FIG. 1. The electric pulse motor is indicated by reference numeral 30 and is rigidly secured to the end of the bar 22. If the tool 14" is desired for drilling, the tool 14 has to be interchanged with the desired tool 14'. To do this amplified command pulses are supplied to the electric pulse motor 30. The motor 30 is then driven to rotate the tool magazine 21 by a half rotation with high accuracy, whereby the desired tool 14" comes under the spindle 15, and the axis of the desired tool 14" is aligned with that of the spindle 15. Then the spindle head 16 is traversed downward by the driving motor 20 through the lead screw 18. In the tool magazine 21, driving gears 31 and an internal gear 32 arranged on an inside wall of the tool magazine 21, have to be provided so that the driving force from the motor 30 may be transferred therethrough to the tool magazine 21.

As seen from FIG. 2, since the tool magazine 21 contains the electric pulse motor 30, with driving gears 31 and an internal gear 32 therein, the tool magazine 21 becomes relatively large in size, heavy in weight and complicated in construction. Furthermore, the cost of the tool magazine 21 becomes fairly high. This is because the circular tool magazine requires an electric pulse motor which only drives the circular tool magazine and a drive control circuit which only controls the electric pulse motor. Furthermore, since a backlash occurs in gears 31 and 32, it is difficult to rotate the tool magazine 21 with high accuracy.

The above-mentioned defects of the drilling machine with an automatic tool changer of the prior art are effectively minimized in the machine of the present invention. This is because the machine of the present invention has neither the electric pulse motor 330, which is driven to rotate the tool magazine 21, nor the gears 31 and 32 of the prior art. According to the present invention, a tool magazine is rotated by the driving motor 20 by way of the spindle head 16 and a unique link mechanism.

Figure 3:
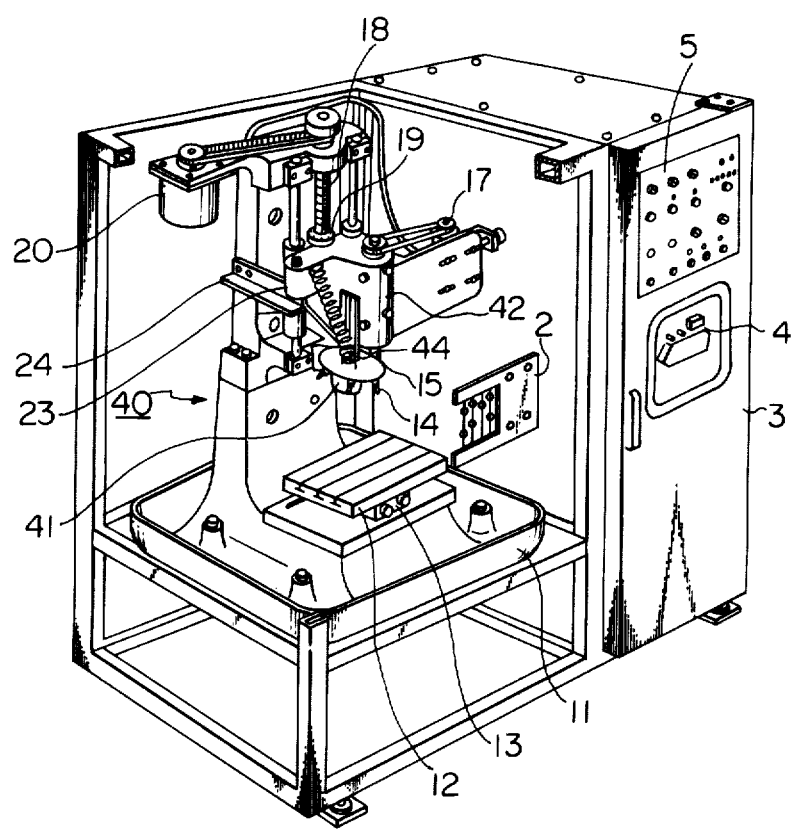
FIG. 3 is a perspective view, partially cut away, showing a drilling machine with an automatic tool changer according to the present invention.

FIG. 3 is a perspective view, partially cut away, showing a drilling machine with an automatic tool changer according to the present invention, contained in a numerically controlled machine tool. In FIG. 3, the members indicated by reference numerals 2 through 5 and 11 through 24, with the exception of numerals 16, 21 and 22, are basically the same as those indicated in FIGS. 1 and 2 by the same reference numerals. A drilling machine with an automatic tool changer of the present invention is indicated by the numeral 40. The drilling machine 40 comprises a tool magazine 41, spindle head 42, rod 43, bar 44 and other members which will be mentioned below.

Figure 4:
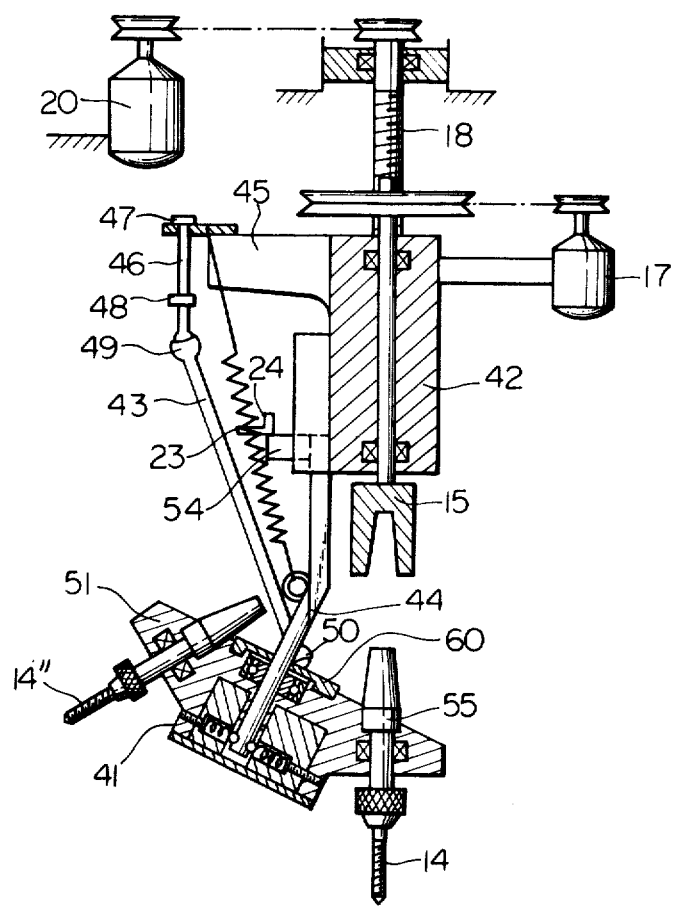
FIG. 4 is a front view of the drilling machine with an automatic tool changer according to the present invention.

FIG. 4 is a schematic and sectional front view of the drilling machine 40 shown in FIG. 3. In FIG. 4, a nose 45 of the spindle head 42 slidably supports a guide bar 46. The guide bar 46 has two stop rings 47 and 48. One end of the rod 43 is universally joined to one end of the guide bar 46 by means of a universal joint 49. The other end of the rod 43 is universally joined to a ratchet wheel 60 by means of a universal joint 50. The ratchet wheel 60 is rotatably supported by the bar 44. The ratchet wheel 60 has four or seven notches (not shown) when there are respectively four or seven tools (14, 14', 14" . . . ). Each of these notches intermittently engages with a detent (not shown) which is pivotally secured to a flange 51 of the tool magazine 41. Accordingly when the rod 43 is pulled up, the ratchet wheel 60 rotates, while at the same time the flange 51 rotates via the notch and said detent. Thus, a desired tool can be transferred under the spindle 15.

Figures 4, 5:
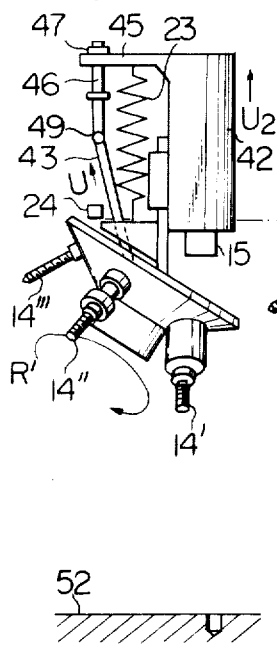
Figures 5, 6:
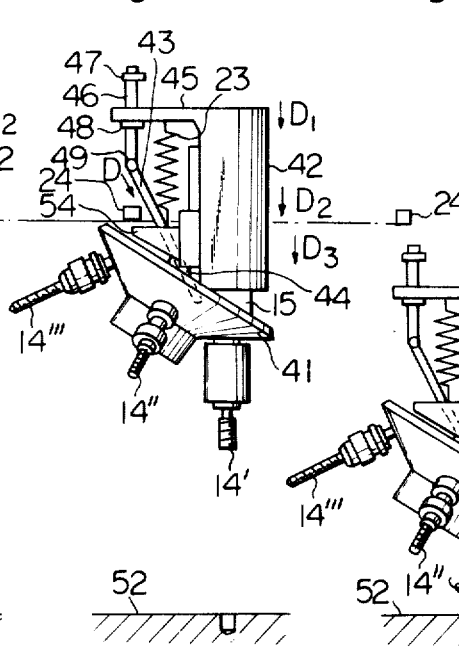

The above-mentioned operation according to the present invention will now be clarified with reference to FIGS. 5-1 through 5-6 and FIGS. 5B-1 through 5B-6. These Figures are schematic views for explaining the operational principle of the drilling machine 40. FIGS. 5-1 through 5-6 are front views and FIGS. 5B-1 through 5B-6 are plan views of the tool magazine in each of the tool changing processes.

Figures 4, 5B:
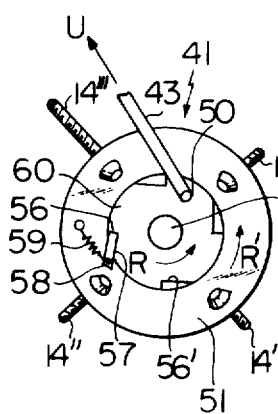
Figures 5, 5B:
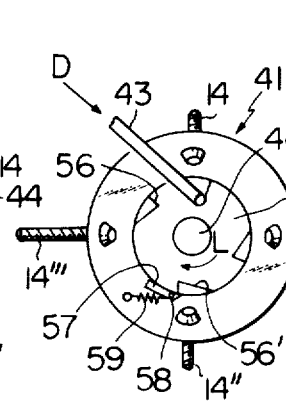
Figures 5, 5B, 6:
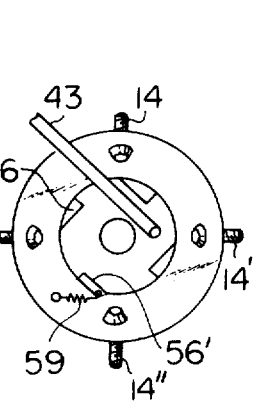

In FIG. 5-1, the tool 14 is engaged in the drilling of a piece of work 52. The tool 14 is driven to rotate by the spindle drivng motor 17 (not shown in FIG. 5-1, but shown in FIG. 4) through the spindle 15 and a drill chuck 53. For the purpose of explanation, it is assumed that when the drilling operation using the tool 14 is finished, another tool, for example tool 14', is desired for completing the next drilling operation. The next drilling operation, using the desired tool 14', is shown in FIG. 5-6. FIGS. 5-2 through 5-5 show each of the processes by which the tool 14 is replaced by the desired tool 14'. At first, in FIG. 5-2, the spindle driving motor 17 (not shown in FIG. 5-2, but shown in FIG. 4) stops rotating. Then both the spindle 15 and the tool 14 stop rotating. At the same time, the driving motor 20 (not shown in FIG. 5-2, but shown in FIG. 4) starts rotating. The spindle head 42 then traverses upward in the direction of the arrow $U_1$. Finally, the stopper 24 abuts against an abutment 54 (shown in FIG. 4). Since the abutment 54 is fixed to the bar 44, both the bar 44 and the tool magazine 41 can no longer traverse upward in the direction of the arrow $U_1$. In FIG. 5-3, since one end of the bar 44 is slidably supported by the spindle head 42, the spindle head 42 can still traverse in the direction of the arrow $U_2$. In this process, an arbor 55 (also shown in FIG. 4) is pulled out and away from the spindle 15 and the nose 45 moves away from the stop ring 48 along the guide bar 46. The coil spring 23, which acts to connect the arbor 55 with the spindle 15, is now stretched quite far in this process and remains so stretched in the next process. Finally, the nose 45 abuts against with the stop ring 47. In FIG. 5-4, the spindle head 42 is still traversing upward in the direction of the arrow $U_2$. In this process, the nose 45 of the spindle head 42 pulls up the stop ring 47 together with the guide bar 46 in the direction of the arrow $U_2$ and the guide bar 46 pulls up one end of the rod 43 in the direction of the arrow U via the universal joint 49. In FIG. 5B-4, when the rod 43 rotates the ratchet wheel 60 direction via the universal joint 50 in the direction of the arrow R with respect to the bar 44. Since a notch 56 engages with a detent 57, which is pivotally connected to the flange 51 of the tool magazine 41, the tool magazine 41 rotates in the direction of the arrow R', together with the ratchet wheel 60 with respect to the bar 44. Finally, both the ratchet wheel 60 and the tool magazine 41 rotate a quarter of a rotation and, thereby the desired tool 14' for the next drilling operation comes under the spindle 15 (not shown in FIG. 5B-4, but shown in FIG. 5-4). At the same time, the driving motor 20 (not shown in FIG. 5-4, but shown in FIG. 4) stops rotating. Then, the motor 20 rotates in a reverse direction. in FIG. 5-5, the spindle head 42 traverses downward in the directin of the arrow $D_1$. At first, the nose 45 of the spindle head 42 parts from the stop ring 47 and traverses downward to the stop ring 48 along the guide bar 46. Then, the spindle head 42 continues to traverse downward together with the stop ring 48 in the direction of the arrow $D_2$, whereby the stop ring 48 pushes down the rod 43 via the universal joint 49 in the direction of the arrow D. In FIG. 5B-5, when the rod 43 is pushed down in the direction of the arrow D, the rod 43 rotates the ratchet wheel 60 via the universal joint 50 (not shown in FIG. 5B-5) in the direction of the arrow L with respect to the bar 44. In this process, the detent 57 does not abut against the notch 56 but moves away therefrom, whereby the detent 57 slips on a side surface of the ratchet wheel 60 without rotating the tool magazine 41. Finally, the detent 57 comes into engagement with a notch 56'. At this time, as seen in FIG. 5-5, the spindle 15 engages with the arbor 55 (not shown in FIG. 5-5).

The spindle head 42 is still traversing downward in the direction of the arrow $D_3$ and the spindle 15 is pushing down the tool magazine 41 through the arbor 55. Since the tool magazine 41 traverses downward together with the bar 44, the abutment 54 moves downward away from the stopper 24. The arbor 55 is still connected firmly with the spindle 15 by means of the coil spring 23. In FIG. 5-6, a drilling operation using the tool 14' begins. The tool 14' is driven to rotate by the spindle driving motor 17 (not shown in FIG. 5-6, but in FIG. 4) through the spindle 15. In FIGS. 5B-4 and 5B-5, the detent 57 is pivotally mounted to the flange 51 of the tool magazine 41 by means of a pivot 58. One end of the detent 57 can abut with the next notch 56', while the other end thereof is pulled outward by means of a coil spring 59.

FIG. 6 is a detailed front view, partially cross-sectioned, of a main portion of the drilling machine with an automatic tool changer according to the present invention. In FIG. 6, the tool magazine 41 has four arbors 55, 55', 55" and 55''' (not shown) mounted on its flange 51 by means of ball-and-roller bearings 61 (shown) and 61', 61", 61''' (not shown). Each of the arbors (55 ... 55''') is rotated by the spindle 15 through a tapered shank coupling 52 and a clutch 63. The spindle 15 is rotatably supported by the spindle head 42. The spindle 15 is rotated by said spindle driving motor (not shown) through a v-belt (not shown) and a V-pulley 64. When the spindle head 42 traverses upward, the tool magazine 41 together with the bar 44 traverse upward. This is because, the arbor (55) always follows the spindle 15 due to the upward pulling force of the coil spring 23. One end of the coil spring 23 is connected to a ring 65 which is fixed to the bar 44. The other end of the coil spring 23 is connected to a U-bolt 66 which is fixed to the nose 45. It should be noted that the other end of the coil spring 23 may also be connected to a U-bolt or the like which is fixed to a frame (not shown). When the spindle head 42 together with the bar 44 and the tool magazine 41 traverse upward, the abutment 54, which is fixed to a sliding member 67 of the bar 44, abuts against the stopper 24 which is fixed to a frame (not shown). Since the two sides of the sliding member 67 are slidably held by L-shaped members 68, which are fixed to the spindle head 42, the L-shaped members 68 can slide with respect to the sliding member 67 and still traverse upward together with the spindle head 42. At this time, the sliding member 67 and the tool magazine 41 remain motionless. Then, the tool magazine 41 moves far away from the table 12 (shown in FIG. 3). As a result, the piece of work 52 (shown in FIGS. 5-1 through 5-6) may be freely moved to any desired position by the table 12, or a tool may be freely interchanged for another desired one. When a tool change is required, the spindle head 42 traverses upward, the nose 45 moves away from the stop ring 48, made of double nuts along the guide bar 46, and abuts against the stop ring 47, made of a metal plate having a hole therein. A distance "d" between the stop ring 47 and the stop of the nose 45, corresponding to a length of a stroke of the nose 45, is adjustable by rotating the double nuts which form the stop ring 48. The distance "d" is selected so as to be such that the spindle 15 may move far away from each of the arbors (55 ... 55''') when the nose 45 and the spindle head 42 traverse upward along the distance "d" in each of the automatic tool changing processes. While the spindle head 42 is traversing, the nose 45 abuts on the stop ring 47 at first and then pulls up the stop ring 47, and the stop ring 47 in turn pulls up the rod 43. Then, the ratchet wheel 60 (shown in FIG. 4 and FIGS. 5B-1 through 5B-6) rotates a quarter of a complete rotation together with the tool magazine 41. If there are seven tools, the ratchet wheel 60 has to rotate one seventh of a complete rotation with respect to the bar 44. In FIG. 6, the ratchet wheel is covered by a cover 69 and the top of the flange 51 is covered by a cone-shaped cover 70. The covers (69, 70) act as a chip-proof wall. It should be noted that the arbors (55 ... 55''') may also be mounted on the ratchet wheel 60. In this case, the universal joint 50, which engages with one end of the rod 43, has to be mounted on the flange 51.

FIG. 7 is a cross-sectional view of the tool magazine 41 taken along the line A—A' in FIG. 6. In FIG. 7, reference numbers up to 70, represent the parts previously described. As mentioned above, since the tool magazine 41 rotates intermittently by a quarter of a rotation with respect to the bar 44, four stop positions of the tool magazine 41 are defined by the balls 71, 71'' (shown) and 71', 71''' (not shown), respectively, when there are four arbors 55 ... 55'''. Each of the balls is pressed against the bar 44 at a cone-shaped trench by means of a coil spring. The tool magazine 41 is rotatably supported through a plain bearing 72. The ratchet wheel 60 is rotatably supported by the bar 44 through a ball-and-roller bearing 73. The ball-and-roller bearing 73 is supported by a collar 74 so as not to slide downward. The collar 74 is fixed to the bar 44 by a bolt 75. The balls (71, 71' ... , ), cone-shaped trench and the coil spring are useful only for stopping each of the arbors (55, 55', ... ) under the spindle 15. The axis of each of the arbors does not align with the axis of the spindle 15 with the extremely high accuracy required even though the detent 57 firmly engages each of said notches (56, 56', ... ). Therefore, indexing pins 76 and 77 are provided. The pin 77 is fixed to the tool magazine 41. When the axis of the arbor comes into alignment with the axis of the spindle, the top of the indexing pin 76 is pressed downward against the spring force of the coil spring 78 by the bottom of the ratchet wheel 60. As a result the indexing pin 76 abuts against the pin 77, whereby the axis of the arbor aligns with the axis of the spindle 15 with an extremely high accuracy. When the ratchet wheel 60 begins to rotate together with the tool magazine 41, the indexing pin 76 climbs over the pin 77.

As explained hereinbefore, the drilling machine with an automatic tool changer according to the present invention has the following advantages when compared to that of the prior art. (1) The tool magazine is of a relatively small size and light weight because no electric pulse motor is contained in the tool magazine. (2) The total cost of the drilling machine is relatively low, because the circular tool magazine requires no electric motor which only drives the circular tool magazine and no drive control circuit which only controls the electric pulse motor.

What is claimed is:

1. A machine provided with an automatic tool changer, comprising:
   a motor,
   a spindle head, means operatively connecting said motor and said spindle head to move said spindle head along an axis,
   a spindle rotatably held by said spindle head,
   a bar having one end thereof slidably supported by said spindle head,
   a tool magazine rotatably supported by the other end of said bar,
   a plurality of tool arbors rotatably held by said tool magazine and arranged such that as said tool magazine is rotated said tool arbors are sequentially aligned with said axis of movement of said spindle head, and means adapting said tool arbors to be engaged by said spindle to rotate said tool arbors and to be disengaged from said spindle,
   spring means urging said bar and said tool magazine attached thereto to a position wherein said tool arbors engage said spindle in driving relationship,
   a rod, means universally connecting one end of said rod to said tool magazine, and means universally connecting the other end of said rod to said spindle head such that as said spindle head is driven by said motor along said axis said rod causes said tool magazine to be rotated with respect to said bar.

2. A machine provided with an automatic tool changer as set forth in claim 1, wherein said means universally connecting one end of said rod to said tool magazine comprises a ratchet wheel, a universal joint operatively connecting said ratchet wheel to said one end of said rod and a detent secured to said tool magazine engaging said ratchet wheel.

3. A machine provided with an automatic tool changer as set forth in claim 2, wherein said means universally connecting the other end of said rod to said spindle head comprises a guide bar slidably mounted to said spindle head, and a universal joint operatively connecting the other end of said guide bar and said other end of said rod.

4. A machine provided with an automatic tool changer as set forth in claim 3, further comprising an abutment on said bar, a stopping element positioned in the path of travel of said abutment limiting the sliding movement of said bar along said spindle head as said spindle head is moved along said axis, and a stop ring on said guide bar limiting the sliding movement of said guide bar with respect to said spindle head.

5. A machine provided with an automatic tool changer as set forth in claim 2, further comprising a plain bearing and a ball and roller bearing operatively connecting said tool magazine and said other end of said bar.

6. A machine provided with an automatic tool changer as set forth in claim 5, further comprising a collar mounted to said other end of said bar supporting said ball and roller bearing.

7. A machine provided with an automatic tool changer as set forth in claim 6, further comprising indexing means associated with said tool magazine and said collar such that as said spindle engages said tool arbors in driving relationship said ratchet wheel engages said indexing means actuating same.

* * * * *